(12) United States Patent
Yadav et al.

(10) Patent No.: US 7,822,027 B2
(45) Date of Patent: Oct. 26, 2010

(54) NETWORK ROUTING TO THE SOCKET

(75) Inventors: Navindra Yadav, San Jose, CA (US);
Gnanaprakasam Pandian, Cupertino, CA (US); James Rivers, Saratoga, CA (US); Scott Emery, Saratoga, CA (US); Pauline Shuen, Palo Alto, CA (US); Murali Duvvury, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 881 days.

(21) Appl. No.: 11/539,023

(22) Filed: Oct. 5, 2006

(65) Prior Publication Data

US 2008/0084888 A1    Apr. 10, 2008

(51) Int. Cl.
*H04L 12/28* (2006.01)

(52) U.S. Cl. ............... 370/389; 370/401; 370/254; 709/242

(58) Field of Classification Search ............... None
See application file for complete search history.

(56) References Cited

U.S. PATENT DOCUMENTS

| | | | |
|---|---|---|---|
| 5,959,989 A | 9/1999 | Gleeson et al. | |
| 6,055,364 A | 4/2000 | Speakman et al. | |
| 6,182,147 B1 | 1/2001 | Farinacci | |
| 6,393,484 B1 | 5/2002 | Massarani | |
| 6,442,158 B1 | 8/2002 | Beser | |
| 6,483,832 B1 | 11/2002 | Civanlar et al. | |
| 6,658,565 B1 | 12/2003 | Gupta et al. | |
| 6,785,274 B2 | 8/2004 | Mahajan et al. | |
| 6,839,348 B2 | 1/2005 | Tang et al. | |
| 6,847,638 B1 | 1/2005 | Wu et al. | |
| 7,016,351 B1 | 3/2006 | Farinacci et al. | |
| 7,095,739 B2 | 8/2006 | Mamillapalli et al. | |
| 7,174,376 B1* | 2/2007 | Daruwalla | 709/223 |
| 7,304,996 B1 | 12/2007 | Swenson et al. | |
| 7,385,977 B2 | 6/2008 | Wu et al. | |
| 7,423,986 B2 | 9/2008 | Grayson et al. | |
| 7,607,021 B2 | 10/2009 | Rayes et al. | |
| 2002/0141418 A1 | 10/2002 | Ben-Dor et al. | |
| 2002/0165980 A1* | 11/2002 | Brown | 709/242 |
| 2004/0095943 A1 | 5/2004 | Korotin | |
| 2004/0202111 A1 | 10/2004 | Beshai et al. | |
| 2006/0187858 A1 | 8/2006 | Kenichi et al. | |
| 2006/0193252 A1* | 8/2006 | Naseh et al. | 370/225 |
| 2007/0025276 A1 | 2/2007 | Zwiebel et al. | |
| 2007/0025277 A1 | 2/2007 | Sajassi et al. | |

OTHER PUBLICATIONS

International Search Report and Written Opinion of the International Searching Authority for International Application No. PCT/US2007/077219 filed Aug. 30, 2007 to Cisco Technology, Inc.

(Continued)

*Primary Examiner*—Bob A Phunkulh
(74) *Attorney, Agent, or Firm*—Cesari and McKenna, LLP; Michael R. Reinemann

(57) ABSTRACT

In one embodiment, detecting data traffic from a host device in a data forwarding domain, injecting a host route associated with the detected data traffic, and updating a forwarding table associated with the host route are provided.

21 Claims, 4 Drawing Sheets

OTHER PUBLICATIONS

"Configuring Dynamic ARP Inspection," Cisco Systems, Inc., May 2006, pp. 1-22.
"Firewall Stateful Inspection of ICMP," Cisco Systems, Inc., Mar. 2003, pp. 1-20.
"Internet Protocol (IP) Multicast," Cisco Systems, Inc., Aug. 2000, pp. 1-15.
"Multicast Deployment Made Easy," Cisco Systems, Inc., Jul. 1999, pp. 1-20.
"TCP/IP Overview," Cisco Systems, Inc., Document ID: 13769, Aug. 2005, pp. 1-11.
Carl-Mitchell, et al., "Using ARP to Implement Transparent Subnet Gateways," IEFT Network Working Group, Oct. 1987, pp. 1-8.
Droms, "Dynamic Host Configuration Protocol," IEFT Network Working Group, Request for Comments 2131, Mar. 1997, pp. 1-41.
Finn, N., "Shortest Path Bridging: An Update on Bridging Technologies," IEEE 802 Tutorial, Cisco Systems, Inc., Jul. 2005, pp. 1-25.
Perlman, et al., "Rbridges: Base Protocol Specification," draft-ieft-trill-rbridge-protocol-00.txt, Trill Working Group, Internet Draft, May 10, 2006, pp. 1-21.
Perlman, R., "Rbridges: Transparent Routing," IEEE INFOCOMM, Jul. 2004, pp. 1-8.
Touch, et al., "A Virtual Internet Architecture," ISI Technical Report 570, Mar. 2003, pp. 1-11.

* cited by examiner

# NETWORK ROUTING TO THE SOCKET

TECHNICAL FIELD

The present disclosure relates generally providing layer 3 forwarding mechanism in data networks.

BACKGROUND

Existing topology for local area networks (LANs) typically include Ethernet as a layer 2 protocol and an internet protocol (IP) v4 or v6 as a layer 3 protocol. This layered approach allows computing devices to communicate using a variety of different layer 3 protocols such as IP, IPX, or Appletalk and so on which were available. Likewise, computers could use a single layer 3 protocol such as IP to communicate while connected via different layer 2 networks (such as FDDI, TokenRing, ATM, or Ethernet).

The IP protocol that are used to establish communication paths at the end nodes (for example, such as ARP and ICMP) are subject to a variety of spoofing, man-in-the-middle, and denial of service attacks (such as, for example, that may be launched against hosts in the same subnet which is a layer 2 domain), but on the other hand, are blocked by the IP forwarding devices such as routers. Furthermore, configuration of routers and tuning the routing protocols is a very involved process.

SUMMARY

Overview

A method in particular embodiments may include detecting data traffic in a data forwarding domain, injecting a host route associated with the detected data traffic, and updating a forwarding table associated with the host route. Also, a method in particular embodiments may include receiving a host route, receiving a subnet route entry corresponding to a subnet from a respective subnet default router, comparing host paths to subnet route paths, and installing the host route when the subnet route paths do not correspond to the host paths.

A system in particular embodiments may include a host device, and a data forwarding device configured to detect data traffic from the host device in a data forwarding domain, the data forwarding device further configured to inject a host route associated with the detected data traffic, and to update a forwarding table associated with the host route.

A system in particular embodiments may include a host device, and a data forwarding device operatively coupled to the host device, the data forwarding device configured to receive a host route from the host device, the data forwarding device further configured to receive a subnet route entry corresponding to a subnet from a respective subnet default router, to compare host paths to subnet route paths, and to install the host route when the subnet route paths do not correspond to the host paths.

A system in particular embodiments may include means for detecting data traffic from a host device in a data forwarding domain, means for injecting a host route associated with the detected data traffic, and means for updating a forwarding table associated with the host route.

These and other features and advantages of the present invention will be understood upon consideration of the following detailed description of the invention and the accompanying drawings.

DESCRIPTION OF EXAMPLE EMBODIMENTS

Figure 1:
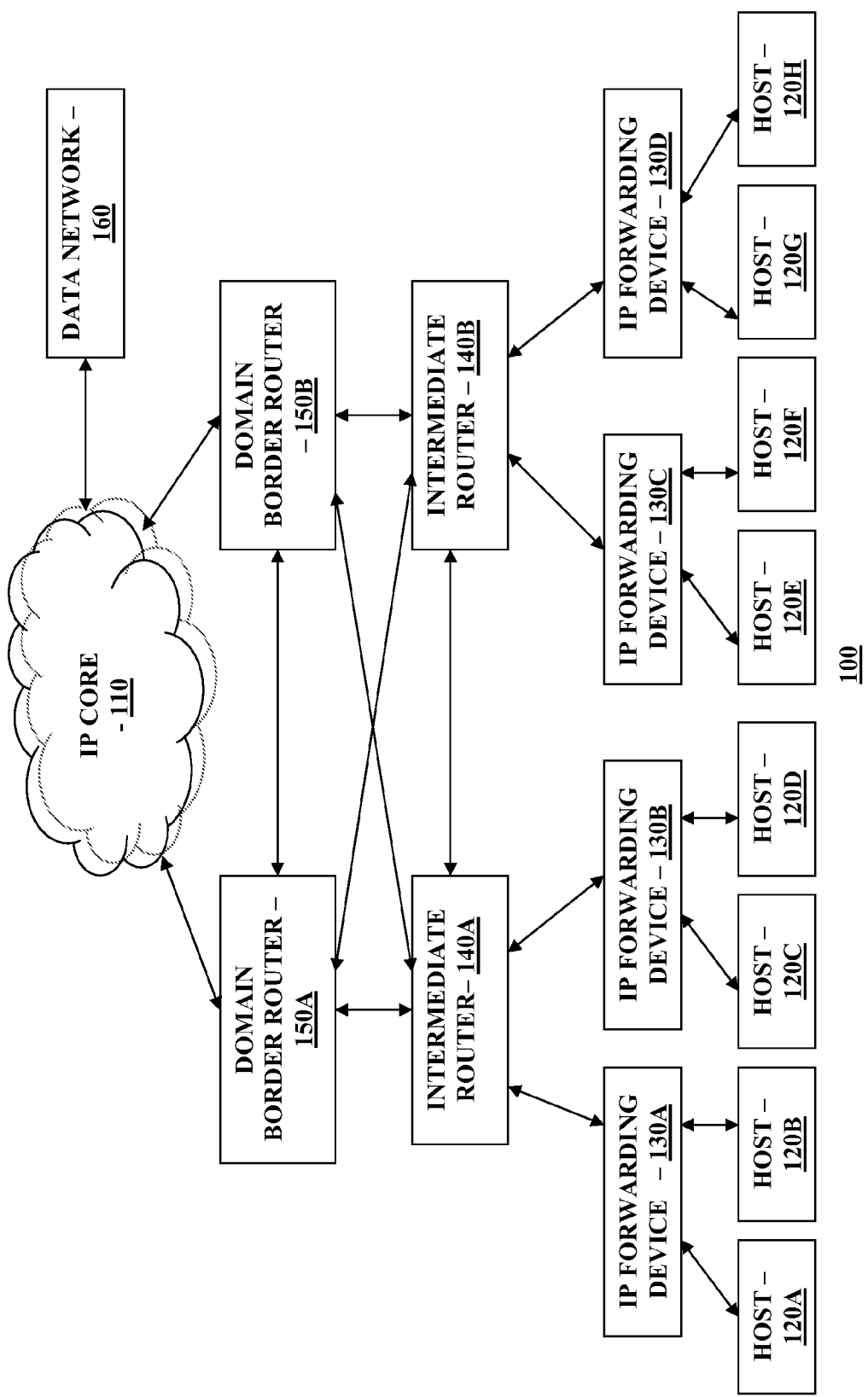
FIG. 1 illustrates an example system for IP forwarding domain.

FIG. 1 is a block diagram of an enterprise access data network seen in the wiring closet, for practicing particular embodiments. Referring to FIG. 1, in particular embodiments, the overall network 100 includes a plurality of Layer 3 IP (Internet Protocol) forwarding domains (also referred to as Routing to the Socket domains), each including domain border routers 150A, 150B. Each of the domain border routers 150A, 150B are further connected to a respective intermediate router 140A, 140B, and further, each intermediate router 140A, 140B are coupled to one or more IP forwarding devices 130A, 130B, 130C, 130D as shown in FIG. 1. Referring back to FIG. 1, further shown is a plurality of end hosts 120A, 120B, 120C, 120D, 120E, 120F, 120G, 120H, each connected to one of the IP forwarding devices 130A, 130B, 130C, 130D in the overall network 100.

In this manner, referring to FIG. 1, in a particular embodiments, each Layer 3 IP forwarding domain (Routing to the Socket domain) includes, a domain border router such as, for example, a switch that connects the Layer 3 IP forwarding domains, for example, to the rest of the enterprise network. Further, each domain border router 150A, 150B in particular embodiments is connected to the intermediate routers 140A, 140B within the respective Layer 3 IP forwarding domain, where the intermediate routers 140A, 140B may include distribution switches. The IP forwarding devices 130A, 130B, 130C, 130D in particular embodiments may include access switches, and further, where each IP forwarding device 130A, 130B, 130C, 130D is configured as the first hop Layer 3 IP forwarding device for the respectively coupled hosts 120A, 120B, 120C, 120D, 120E, 120F, 120G, 120H.

Referring back to FIG. 1, in particular embodiments, the domain border routers 150A, 150B may be configured to connect to more than one Layer 3 IP forwarding domain. That is, domain border router 150A may be connected to both intermediate routers 140A and 140B, and further, domain border router 150B may be connected to both intermediate routers 140A and 140B. In one aspect, if the domain border router 150A or 150B interconnects multiple Layer 3 IP forwarding domains, the interface on the domain border router 150A or 150B are associated to all of the multiple Layer 3 IP forwarding domains.

As discussed in further detail below, the IP forwarding devices 130A, 130B, 130C, 130D, intermediate routers 140A, 140B and the domain border routers 150A, 150B in the Layer 3 IP forwarding domains in particular embodiments are configured to run a routing protocol to determine the respective domain topology and the respective hosts 120A, 120B, 120C, 120D, 120E, 120F, 120G, 120H, that are connected to the respective Layer 3 IP forwarding domain.

Address Allocation for IP Forwarding Devices

In particular embodiments, the hosts 120A, 120B, 120C, 120D, 120E, 120F, 120G, 120H, and the IP forwarding devices 130A, 130B, 130C, 130D within the Layer 3 IP forwarding domains are associated with one or more IP addresses for transmitting and receiving data traffic. In one aspect, the hosts 120A, 120B, 120C, 120D, 120E, 120F, 120G, 120H, and the IP forwarding devices 130A, 130B, 130C, 130D may belong to any one of the subnets that are managed by the respective Layer 3 IP forwarding domain.

More particularly, each IP forwarding device 130A, 130B, 130C, 130D in the Layer 3 IP forwarding domain need at least one IP address that it is uniquely associated with in the network. That is, in particular embodiments, in the Layer 3 IP forwarding domain, one IP address is used for loop back interface, and all other interfaces in the respective IP forwarding device to be unnumbered interfaces. To allocate a loop back IP address to an IP forwarding device, a block of addresses from a subnet may be reserved. In one aspect, the block of addresses may not come from a single subnet of a Layer 3 IP forwarding domain. Indeed, in particular embodiments, when the block of address is assigned from a single subnet, the debugging procedure may be simplified.

In particular embodiments, the IP address of an IP forwarding device may be assigned based on user configuration, or by using DHCP, or by assignment from the respective domain border router. More specifically, the IP forwarding device may be configured with an IP address at the boot up time. Alternatively, the IP forwarding device may be configured to use DHCP to retrieve an IP address from a server in the network.

In addition, the domain border router may be configured to assign an IP address to the IP forwarding devices in the Layer 3 IP forwarding domains when an IP forwarding device joins the Layer 3 IP forwarding domain. More specifically, the network administrator may configure a domain border router with one or more subnets which will be used for all IP forwarding devices in a particular Layer 3 IP forwarding domain. As such, when the domain border router assigns an IP address to an IP forwarding device, the domain border router is configured in particular embodiments to generate a map between the IP forwarding device's MAC address and the assigned IP address. The generated map may then be used to provide the same IP address when the IP forwarding device reboots.

In a further aspect, the administrator may configure another loop back IP address for network management purposes, separating the management IP address from the operational IP address. This approach may provide improved troubleshooting and network security. More specifically, the administrator may configure the network such that only management IP address is allowed for telnet and other purposes. Other security mechanism such as Access Control Lists (ACLs) may be applied on the management IP address. Using a separate IP address for network management, the administrator may configure a subnet or a set of IP addresses with an active router.

In particular embodiments, the domain border router 150A, 150B are configured with an IP address from each subnet. The IP address is used, in particular embodiments, to assign IP addresses to the respective one or more hosts 120A, 120B, 120C, 120D, 120E, 120F, 120G, 120H from a DHCP server, for example, as discussed in further detail below.

Host IP Address Allocation

As discussed above, referring back to FIG. 1, each host 120A, 120B, 120C, 120D, 120E, 120F, 120G, 120H in the Layer 3 IP forwarding domain is associated with one of the subnets of the respective Layer 3 IP forwarding domain. In particular embodiments, the hosts 120A, 120B, 120C, 120D, 120E, 120F, 120G, 120H may be configured to acquire the IP address by, for example, user configuration or via the DHCP server. That is, in particular embodiments, the network administrator may manually configure a static IP address on the respective one of the hosts 120A, 120B, 120C, 120D, 120E, 120F, 120G, 120H.

Alternatively, using the DHCP server, the hosts 120A, 120B, 120C, 120D, 120E, 120F, 120G, 120H may be configured to use DHCP protocol to acquire a respective IP address. More specifically, the respectively coupled IP forwarding devices 130A, 130B, 130C, 130D are configured as a DHCP relay agent, where a predefined hint value is provided to the DHCP server. The DHCP server in particular embodiments may be configured to use the predefined hint value received from the IP forwarding device to determine an appropriate subnet and an IP address for the particular host. Given that each IP forwarding device 130A, 130B, 130C, 130D has only one loop back address and may be from a single subnet, the use of such a loop back address may result in assigning an IP address from a single subnet for all hosts 120A, 120B, 120C, 120D, 120E, 120F, 120G, 120H in the Layer 3 IP forwarding domain.

It is to be noted that in particular embodiments, the IP address of the host in the Layer 3 IP forwarding domain must belong to one of the subnets of the Layer 3 IP forwarding domain. If this is not the case, then the host route information is not propagated throughout the Layer 3 IP forwarding domain by the respective IP forwarding device. Accordingly, in particular embodiments, the IP forwarding device may be configured to verify that all IP addresses of the hosts connected to the IP forwarding device are part of the subnets that are contained within the Layer 3 IP forwarding domain.

Host Learning Mechanism

To forward traffic to a host, the IP forwarding device in particular embodiments is configured to learn the paths to reach the hosts in a given Layer 3 IP forwarding domain. That is, the IP forwarding device in particular embodiments is configured to learn all its associated hosts and then, propagate the host association information throughout the Layer 3 IP forwarding domain. In one aspect, the IP forwarding device may be configured to perform host learning mechanisms using one or more of the following approaches: (1) static configuration which provides a binding of the host IP address to layer 2 rewrite address (for example, MAC address) along with the port and IP forwarding device to which the host is attached, (2) snooping DHCP message exchanges between the host and a trusted DHCP Server, (3) wireless access point (WAP)'s host database, (4) solicited ARP reply packet inspection, (5) unsolicited/gratuitous ARP reply, or (6) learning the source IP address from IP packet inspection.

More specifically, in particular embodiments, IP forwarding device may be configured to learn the information of the associated hosts based on administrator configuration and association of an IP address of the host to a port of a switch (e.g., forwarding device) in the Layer 3 IP forwarding domain. In this approach, the administrator may configure the MAC address of the host, which provides sufficient information for the associated IP forwarding device to forward the traffic to the connected host.

Using DHCP snooping, when a host uses DHCP to acquire an IP address, in particular embodiments, the packets are snooped and the binding between MAC address, IP address and the associated port are learned by the respective IP forwarding device. The WAP's host database may be built using a predefined control signaling between the Wireless Access Point (WAP) and the IP forwarding device, or alternatively, using control signaling between the IP forwarding device and another trusted entity (for example, such as a wireless controller device) responsible for handling wireless device authentication and association. Alternatively, in a further embodiment, in the case of using WAP's host database, the wireless access points are configured to build a list of all associated hosts which may be used to learn the associated hosts. In one aspect, the wireless access point may use the information indicating the list of associated hosts when the wireless access point is configured as an IP forwarding device. Alternatively, the wireless access point may be configured to provide the information indicating the list of associated hosts to the IP forwarding device to which it is connected.

In the case where ARP reply packet inspection is performed to determine the hosts, the IP forwarding device may be configured in particular embodiments to initiate a host probe by issuing an ARP request for unknown hosts in the Layer 3 IP forwarding domain. When a reply is received in response to the issued ARP request, the IP forwarding device may be configured to inspect the received packet and associate the host with the port on which the packet is received.

In a further embodiment, using IP packet inspection, the host paths to reach the hosts may be learned by the IP forwarding device in the Layer 3 IP forwarding domain. For example, when a packet is receive from an unknown source on a given port, unicast reverse path forwarding (uRPF) may be configured to trigger an exception path and send the packet to the IP forwarding device for host learning. The IP forwarding device may be configured to learn the host address if the host belongs to one of the subnets that the host manages. The packet is then allowed to be forwarded to the destination host after the host is learned. Alternatively, IP source guard or IP port security information may be used as triggers to learn the source address of the host. Furthermore, in another aspect, access control lists (ACLs) may be installed for all host routes that were learned on a given port. For new hosts, the ACL may be configured to detect and transmit the packet to the IP forwarding device to learn the new host addresses.

Host Mobility in the Layer 3 IP Forwarding Domain

Referring back to FIG. 1, in particular embodiments, the one or more hosts 120A, 120B, 120C, 120D, 120E, 120F, 120G, 120H may be configured in the Layer 3 IP forwarding domain 100 to move from a respective one of the IP forwarding devices 130A, 130B, 130C, 130D to another one of the IP forwarding devices 130A, 130B, 130C, 130D. In one aspect, the one or more hosts 120A, 120B, 120C, 120D, 120E, 120F, 120G, 120H are not required to acquire a new IP address when the one or more hosts 120A, 120B, 120C, 120D, 120E, 120F, 120G, 120H moves from the respective one of the IP forwarding devices 130A, 130B, 130C, 130D to another one of the IP forwarding devices 130A, 130B, 130C, 130D as long as the one or more hosts 120A, 120B, 120C, 120D, 120E, 120F, 120G, 120H moves within the Layer 3 IP forwarding domain 100. As a result, it is possible to achieve minimal connectivity loss and thus improved mobility for the one or more hosts 120A, 120B, 120C, 120D, 120E, 120F, 120G, 120H.

More specifically, in particular embodiments, when the one or more hosts 120A, 120B, 120C, 120D, 120E, 120F, 120G, 120H moves from the respective one of the IP forwarding devices 130A, 130B, 130C, 130D to another one of the IP forwarding devices 130A, 130B, 130C, 130D, two different paths are established for the one or more hosts 120A, 120B, 120C, 120D, 120E, 120F, 120G, 120H to send and receive traffic from another one or more hosts 120A, 120B, 120C, 120D, 120E, 120F, 120G, 120H. The two different paths in particular embodiments are downstream path and upstream path.

In one aspect, the downstream path allows traffic to be forwarded to a mobile host. In this case, the IP forwarding devices 130A, 130B, 130C, 130D are configured to acquire information of the mobile host such as its current location and/or the mobile host's association to the respective one of the IP forwarding devices 130A, 130B, 130C, 130D in order to forward the traffic to the mobile host. The mobile host's association to the respective one of the IP forwarding devices 130A, 130B, 130C, 130D is propagated in the Layer 3 IP forwarding domain 100 (FIG. 1) using one or more predetermined routing protocols. Additionally, the upstream path as discussed above is configured to allow the mobile host to send traffic to another one or more hosts 120A, 120B, 120C, 120D, 120E, 120F, 120G, 120H in the network.

Referring back, in establishing the downstream path to forward data traffic to the mobile host, the IP forwarding devices 130A, 130B, 130C, 130D are configured to learn the association of the mobile host to the respective one of the IP forwarding devices 130A, 130B, 130C, 130D which is then propagated within the network based on a predefined routing protocol.

More specifically, the first hop IP forwarding device of the mobile host is configured to learn of the mobile host after it moves in the network 100. The host learning by the first hop IP forwarding device may be based the host learning mechanism discussed above. More specifically, in particular embodiments, the administrator or user may statically configure the host association information at the respective IP forwarding device. When the host moves, the administrator or the user removes the existing configured host association information and reconfigures the association at the IP forwarding device to which the host has moved.

Alternatively, using DHCP snooping, the host may be configured to send a new DHCP message when it moves from one IP forwarding device to another. However, since the host is already associated with an IP address, and the Layer 3 IP forwarding domain 100 does not require the mobile host to acquire a new IP address, the mobile host may need to be configured to renew or request an IP address from the DHCP server.

In still another embodiment, the IP forwarding device may be configured to learn the mobile host association when the mobile host moves based on the host database of the wireless access points. More particularly, since a mobile host associates with a wireless access point before it can transmit or receive data, when the wireless access point is configured to provide the host database to the corresponding IP forwarding device in the Layer 3 IP forwarding domain 100, the IP forwarding device may learn of the mobile host association based on the wireless access point's host database.

In yet another approach, when an ARP request is generated and sent to the mobile host, the IP forwarding device may be configured to learn the mobile host association based on the inspection of the ARP reply packet in response to the ARP request. Alternatively, if the mobile host does not need to receive data traffic before it sends out any packets, the mobile host may be configured to transmit a packet after it moves to a new location, and thus the mobile host association to the respective IP forwarding device may be based on the inspection of the IP packet.

In the case where the mobile host moves to a new location and needs to receive data traffic before it sends out any packet, host probing or host tracking may be used to learn of the mobile host association with the IP forwarding device at the new location. More specifically, in the case of host probing, the IP forwarding device may be configured to send ARP requests to known and unknown hosts in the Layer 3 IP forwarding domain 100. In response to the ARP requests, the hosts send a respective ARP reply, which may be used by the first hop IP forwarding devices to learn the respective host IP addresses.

In particular embodiments, an IP forwarding device may be configured to initiate a host probe when a packet to an unknown destination (but belonging to one of the subnets of the Layer 3 IP forwarding domain 100) is detected in the Layer 3 IP forwarding domain 100. In this case, the IP forwarding device may be configured to send out a request to all other IP forwarding devices in the Layer 3 IP forwarding domain 100 to confirm validity of the unknown destination. When the other IP forwarding devices receive the request to confirm the validity of the unknown destination, the IP forwarding devices are configured in particular embodiments to send out an ARP request on all host ports. Thus, when the ARP reply is received, the first hop IP forwarding device is configured to learn the host and propagate the host association information in the Layer 3 IP forwarding domain 100. Once the host association information is learned by all IP forwarding devices, data traffic may be directly send to the mobile host.

In the case where a flood of host probes proliferate within the Layer 3 IP forwarding domain 100 based on a large number of packets with unknown destinations, the ARP probes may be throttled by each IP forwarding device 130A, 130B, 130C, 130D. In particular embodiments, each IP forwarding device 130A, 130B, 130C, 130D and/or a central device like one of 140A, 140B, 150A, 150B may be configured to throttle before originating the host probe or when sending ARP messages.

In another embodiment, host probe mechanism may be used to detect the correct location of the host in the Layer 3 IP forwarding domain 100, and also to remove any stale host—IP forwarding device associations in the Layer 3 IP forwarding domain 100. That is when a host moves and forms an association with another IP forwarding device, there may be two associations in the Layer 3 IP forwarding domain 100 for the particular host. In this case, the IP forwarding device in particular embodiments may be configured to install the most recent host association, for example. To remove a stale association, the IP forwarding devices (previously associated with the mobile host and newly associated with the mobile host) are configured to send out ARP request on their respective ports. The IP forwarding device that does not receive an ARP reply is then configured to withdraw the association from the Layer 3 IP forwarding domain 100.

Referring back, in the case where host tracking is used to achieve host mobility by removing a stale association entry from the Layer 3 IP forwarding domain 100, the IP forwarding device is configured to keep track of the host upon learning of its host IP address to determine that it is connected in the Layer 3 IP forwarding domain 100. In particular embodiments, the IP forwarding device may be configured to send out periodic updates (e.g., ARP requests) to known hosts on its ports. In this manner, in particular embodiments, hardware resources may be conserved by removing a host entry when a host does not response to the ARP message (since absence of response indicates either the host has died or moved). Moreover, ARP aging out of the host entries may be avoided.

Referring back, the upstream path is established for the one or more hosts 120A, 120B, 120C, 120D, 120E, 120F, 120G, 120H to send and receive traffic from another one or more hosts 120A, 120B, 120C, 120D, 120E, 120F, 120G, 120H when the one or more hosts 120A, 120B, 120C, 120D, 120E, 120F, 120G, 120H moves from the respective one of the IP forwarding devices 130A, 130B, 130C, 130D to another one of the IP forwarding devices 130A, 130B, 130C, 130D. As discussed above, the downstream path allows traffic to be forwarded to a mobile host, while the upstream path allows the mobile host to send out data to another host. To do so, the mobile host in particular embodiments is configured to build up an ARP table which is configured to be intact across moves by the mobile host. That is, whenever a mobile host moves in the Layer 3 IP forwarding domain 100, the ARP table is configured to be valid, and thus avoids the mobile host from having to send out another ARP request and to wait for the reply and build the ARP table with each move in the Layer 3 IP forwarding domain 100.

For example, before the mobile host can send out data packets to another host in the Layer 3 IP forwarding domain 100, the mobile host needs to know how to reach the other host. If the other host resides in the same subnet as the mobile host, then the mobile host may send out an ARP request seeking for the other host. On the other hand, if the other host resides in a different subnet, then the mobile host may be configured to send out an ARP request looking for the default gateway of the other host's subnet. Once an ARP reply is received from the other host or from the default gateway, the mobile host is configured in particular embodiments to install an ARP entry in a local table, which is then used to forward traffic.

In particular embodiments, the MAC address of the default gateway is configured to not change when the other host (receiving traffic from the mobile host) moves from one IP forwarding device to another IP forwarding device in the Layer 3 IP forwarding domain 100. That is, in particular embodiments, the first hop IP forwarding device of the other host is configured to proxy for all IP addresses of subnets of the Layer 3 IP forwarding domain 100. This allows the hosts to communicate with each other during moves without altering their representation of the first hop IP forwarding device.

More specifically, in particular embodiments, the proxy ARP mechanism allows an IP forwarding device to respond to all ARP requests for which the IP forwarding device is acting as a proxy. For example, a router may be configured with a set up subnet addresses and proxy for all the subnet addresses. When an ARP request is received from one of the hosts in the subnet, the router may be configured to send out a reply with its MAC address.

In one aspect, the IP forwarding devices are configured to proxy for all host addresses in the subnets owned by the Layer 3 IP forwarding domain. When an ARP packet is received for any host IP address that belongs to the domain of the IP forwarding device, the IP forwarding device is configured to reply with its MAC address. Thus, when the mobile host is looking for the other host to which the data traffic is to be sent, regardless of the other host's subnet, the first hop IP forwarding device of the mobile host is configured to respond with its MAC address. This allows the mobile host to reach the other host regardless of the location of the other host (traffic destination). In this manner, in particular embodiments, the mobile host may continue to communicate with the other host without changing its ARP table during the other host moves within the domain.

In addition, the first hop IP forwarding device MAC address in particular embodiments is configured to not change when the mobile host moves from one IP forwarding device to another IP forwarding device in the Layer 3 IP forwarding domain 100. In one aspect, this may be achieved by using virtual MAC address for the IP forwarding devices.

More specifically, in particular embodiments, the IP forwarding devices 130A, 130B, 130C, 130D are configured to share one or more virtual MAC addresses. The virtual MAC addresses are used whenever an IP forwarding device receives an ARP request for one of the hosts of its domain. As discussed above, since proxy ARP is used on all IP forwarding devices, 130A, 130B, 130C, 130D, when an ARP request is received, the first hop IP forwarding device may be configured to use a virtual MAC address in its ARP reply. When a host moves, it may be configured to continue to use the virtual MAC address as the destination MAC address for all packets that the host originates. In this manner, the host may move and continue to send traffic without changing the ARP table in the host.

In particular embodiments, the first hop IP forwarding device may be configured to use a single virtual MAC address for all subnets. Alternatively, the first hop IP forwarding device may be configured to use a distinct virtual MAC address for each subnet. In one aspect, the virtual MAC addresses may include a set of fixed MAC addresses or known MAC addresses. In addition, a subnet may be mapped to a MAC address with a fixed prefix MAC address.

In the manner described, in particular embodiments, the proxy ARP and virtual MAC address mechanisms described above may be used to allow a host to move while communicating with other hosts in the Layer 3 IP forwarding domain 100.

Referring back to FIG. 1, since the first hop IP forwarding device is configured to route data packets between two subnets, for example, by switching packets locally using proxy ARP and virtual MAC address for all ARP requests, in particular embodiments, the first hop IP forwarding device may be configured to function as the default gateway.

Route Propagation

To forward traffic in the Layer 3 IP forwarding domain 100, the IP forwarding devices 130A, 130B, 130C, 130D and routers 140A, 140B, 150A, 150B need to know the host to forwarder association. The host to forwarder association provides information to each of the forwarding devices (switches and routers) in the network 100 related to the set of forwarder(s) the particular host is connected. In one aspect, the forwarding devices (switches and routers) in the network 100 can avoid computing the path to the host by assigning the same path as it has already computed to reach the forwarder(s) associated with the particular host. The forwarder route provides information on how to reach a specific IP forwarding device, and IP addresses such as loop back interface and/or management interface of an IP forwarding device are configured to be propagated using a configured routing protocol. In addition, the host association as described above is configured to indicate the association of the host in the Layer 3 IP forwarding domain 100 to the respective connected specific IP forwarding device. That is, to send traffic to a particular host, the traffic is sent to the IP forwarding device associated with the host (for example, that is directly connected to the host). Once the path to the IP forwarding device is known, the path to the associated host (or the host route) may be determined and installed in the hardware.

In particular embodiments, a host is configured to always have one association or path with a particular IP forwarding device. On the other hand, each IP forwarding device may be configured with multiple paths. As such, in one aspect, based on the different path information, suitable routing protocol may be selected, or routes may be computed appropriately. In addition, improved scalability and performance may be achieved in the Layer 3 IP forwarding domain 100. For example, when there is a change in a link status (up or down), only one update regarding the IP forwarding device routes may be needed. Once the update is received, the host routes may or may not change. Similarly, when a host association changes only one update about that host needs to be sent.

Referring yet again to FIG. 1, since the Layer 3 IP forwarding domain 100 includes hosts and IP forwarding devices, all internal route information in a domain includes IP forwarding device routes and host association. Domain border outers 150A, 150B may be configured to advertise a subnet route or network addresses that are external to the domain.

In particular embodiments, Open Shortest Path First (OSPF) routing protocol may be used for IP forwarding device route propagation. OSPF is a link state routing protocol that provides complete topology of the network. In one aspect, OSPF routing protocol may be configured to send updates hop by hop. That is, OSPF routing protocol may be configured to advertise the IP forwarding device loop back addresses using the router links. Additionally, Enhanced Interior Gate Routing Protocol (EIGRP) may be used for IP forwarding device route propagation. EIGRP is a distance-vector protocol and provides an efficient manner in which to handle changes in network topologies. Additionally, other protocols such as Intermediate System to Intermediate System (ISIS), interior Border Gateway Protocol (iBGP) and the like may be used for route propagation.

Referring still again to FIG. 1 in particular embodiments, each IP forwarding device 130A, 130B, 130C, 130D in the Layer 3 IP forwarding domain 100 are configured with two modules—a host association learning application and a host association propagation protocol. In one aspect, the host association learning application module in the IP forwarding device is configured to learn the associations between the IP forwarding device and the respective hosts based on, for example, the host learning mechanism described above. In addition, the host association learning application may be further configured to propagate the association in the domain using a predetermined protocol, and also, to learn all other host associations from other IP forwarding devices in the domain.

Once a host association is learned as described above, the host association learning application may be configured to determine an actual path to the host which in particular embodiments, is the same as the path to the IP forwarding device that originated the host association. The path to the IP forwarding device may be available from other routing protocols that propagated the IP forwarding device routes. Moreover, the host association learning application may further be configured to install the host route in the routing table of the IP forwarding device, and in addition, to determine if there are any duplicate associations that exist in the domain based on, for example, a host move within the domain, or a duplicate IP address in the domain. If there are duplicate associations, the IP forwarding device and the advertised duplicate associations need to resolve the association as discussed in further detail below.

When duplicate associations of a host exist, only one of the associations is determined to be valid. Once an IP forwarding device that originated a host association detects a duplicate host association from another IP forwarding device, the IP forwarding devices that originated the host association need to validate whether their association with the host is valid. If the association no longer exists, then the association is withdrawn from the network.

That is, in particular embodiments, a host probe sends an ARP message to the host to see if the host is still connected. If there is no response, then the association is deemed no longer valid, and the IP forwarding device is configured to withdraw the host association that it previously advertised. On the other hand, if in response to the ARP message, the host responds, then the host association is determined to be valid. Also, if no IP forwarding device withdraws an association and a duplicate entry still exists for beyond a predetermined time period (based on, for example, duplicate IP address configuration in the domain), an error state may be logged or the port that is connected to the host may be disabled.

Referring back, the host association propagation protocol in particular embodiments may be configured to forward host associations among IP forwarding devices and provide APIs to the application that needs or sends the associations.

Additionally, interior Border Gateway Protocol (iBGP) may be used to propagate host routes in the Layer 3 IP forwarding domain 100 in accordance with particular embodiments. More specifically, each iBGP is configured to advertise only directly connected hosts, and does not advertise another other host routes. Moreover, by setting up connections with every other IP forwarding device in the domain, the iBGP process may be configured to update all other IP forwarding devices. Further, using iBGP, all host associations may be provided to an application that can monitor for duplicate host routes.

Forwarding Table Optimization

As discussed above, referring back to FIG. 1, in Layer 3 IP forwarding domain 100, data packets are forwarded based on host routes. Each IP forwarding device is configured to store host route entry in, for example, in software and/or hardware forwarding tables. Moreover, under certain conditions, the IP forwarding device may be configured to keep one host entry under multiple contexts (such as VRF) in hardware forwarding tables. In such cases, the number of entries that are needed in hardware may be multiple times the number of hosts in the Layer 3 IP forwarding domain 100. In addition, if the domain supports a large number of hosts, the number of entries in the hardware tables of the switches increases.

Accordingly, in particular embodiments, only needed entries in switch hardware may be tracked and maintained based on a predetermined procedure. More specifically, in particular embodiments, the IP forwarding device may be configured to receive the host routes (associations) from other IP forwarding devices in the domain, the IP forwarding device may be further configured to receive a subnet route entry for each subnet from corresponding subnet default routers. A default router for a subnet in particular embodiments may be configured to advertise the subnet entry.

When installing a host route, all paths (more than one path if equal cost paths exist) of a host is compared against a less specific route which, in particular embodiments, may be the subnet route paths. If subnet route paths match exactly with host paths (including equal cost routes), then the host route is not required to be installed in the forwarding table. Since the less specific or subnet route paths and the indirect host routes are reachable via distribution switches (140A or/and 140B), first hop IP forwarding devices may not need to install any indirect host routes. This may provide substantial savings in the number of entries in hardware forwarding tables. Moreover, the performance of the Layer 3 IP forwarding domain 100 may be improved since a change in a host association may not result in updating hardware tables.

In particular embodiments, the procedure described above may be applied to the domain border routers 150A, 150B in addition to the first hop IP forwarding devices. More specifically, as described above, domain border routers 150A, 150B can reach all hosts via distribution switches. For each subnet, the domain border router may be configured to install a route (equal cost routes) via distribution switches. If a host route is reachable via both distribution routes, then the host route is not required to be installed. In one aspect, the domain border routers 150A, 150B may need to install only subnet addresses for all subnets of the domain. This provides substantial optimization of hardware and software forwarding table resources and processing resources at the domain border routers 150A, 150B.

Figure 2:
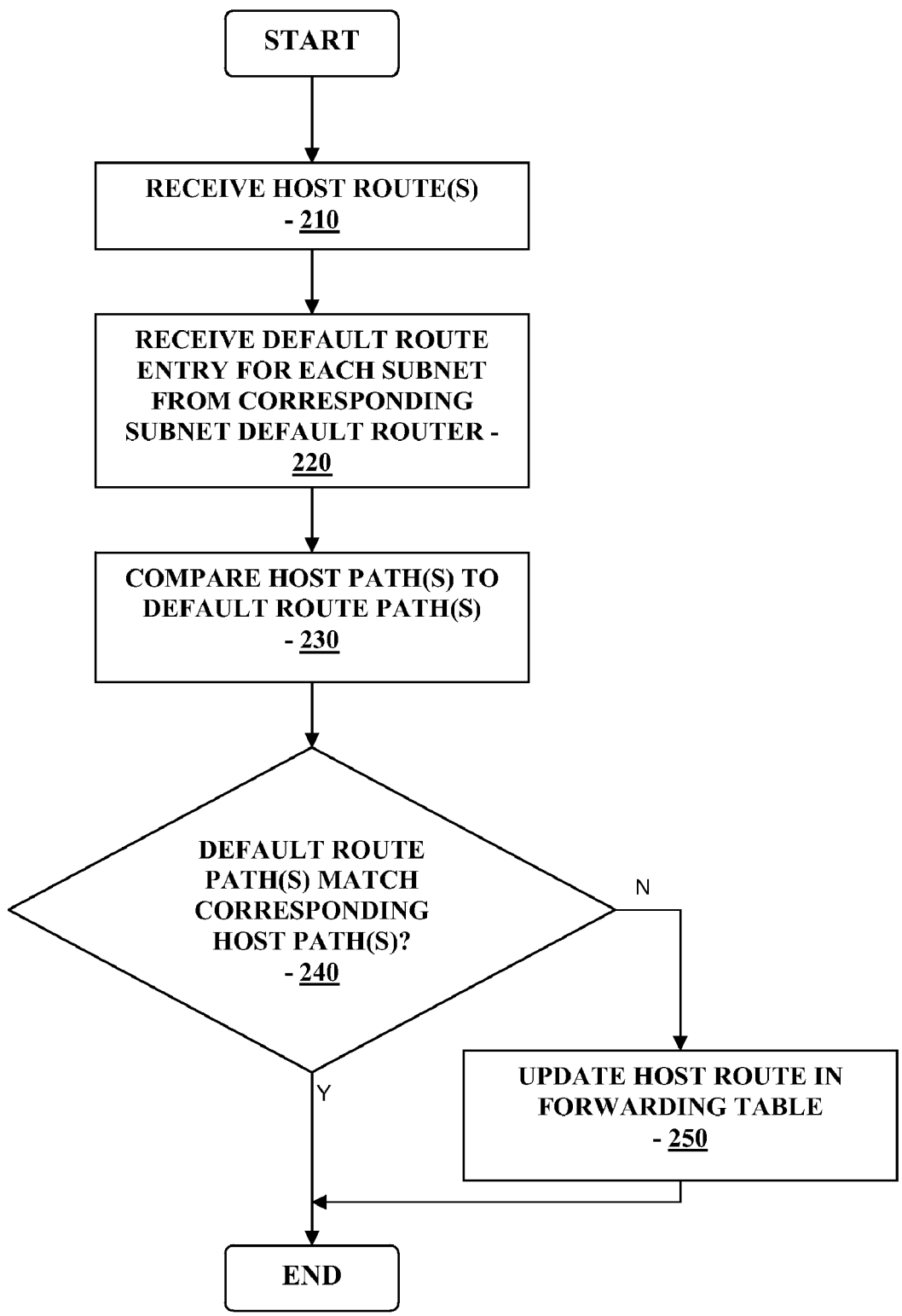
FIG. 2 illustrates an example method for IP forwarding optimization.

FIG. 2 is a flowchart illustrating IP forwarding optimization in accordance with particular embodiments. Referring to FIG. 2, at step 210, one or more host routes (associations) is received. For example, in particular embodiments, one of the IP forwarding device 130A, 130B, 130C, 130D is configured to receive host routes from the other IP forwarding devices. Thereafter, at step 220, the IP forwarding device is configured to receive a subnet route entry for each subnet from corresponding subnet default routers. For example, in particular embodiments, a default router for a subnet may be configured to advertise the subnet entry.

Referring back to FIG. 2, at step 230, the host path is compared to the subnet route path, and if at step 240 it is determined that the default route path matches the corresponding host path, then the routine terminates. In other words, in particular embodiments, if subnet route paths match host paths, (including equal cost routes) as discussed above, then the host route is not installed in the hardware or software forwarding table of the IP forwarding device. On the other hand, if at step 240 it is determined that the subnet route path does not match the corresponding host path, then at step 250, the host route is updated in the forwarding table.

Since the subnet route paths and all indirect host routes are reachable via distribution switches (for example, the next level switches), the first hop IP forwarding devices in particular embodiments does not have to install any indirect host routes, resulting in reduced number of entries in the hardware forwarding table, and also improving the performance of the IP forwarding device since for example, a change in host association may not result in updating hardware forwarding table entries.

Figure 3:
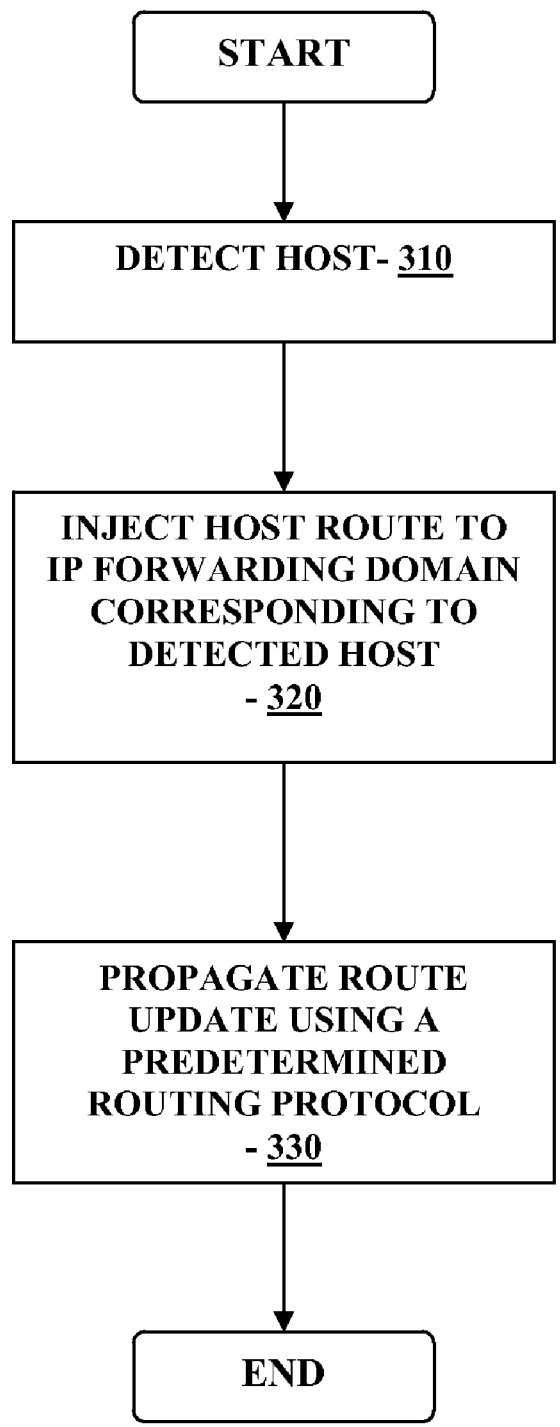
FIG. 3 illustrates an example method for detection and advertising of host(s)

FIG. 3 is a flowchart illustrating detection and advertising of host(s) in the IP forwarding domain in accordance with particular embodiments. Referring to FIG. 3, at step 310, a host device is detected by an IP forwarding device. Thereafter at step 320, the IP forwarding device in particular embodiments is configured to inject a host route associated with the detected host device in the IP forwarding domain. The host route update is then propagated at step 330 throughout the IP forwarding domain using a configured routing protocol. For example, in particular embodiments, OSPF may be used as the routing protocol for propagating the route update in the IP forwarding domain.

Figure 4:
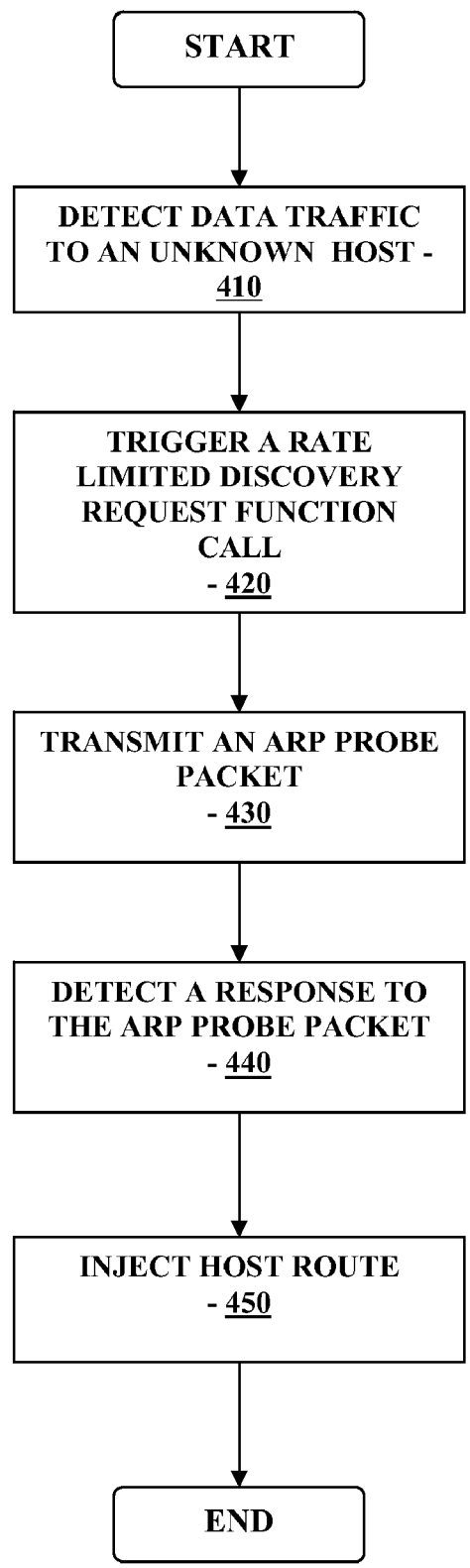
FIG. 4 illustrates an example method for detection and advertising of host(s).

FIG. 4 is a flowchart illustrating the detection and advertising of host(s) in the IP forwarding domain in accordance with another embodiment. Referring to FIG. 4, when data traffic sent to an unknown host device in an IP forwarding domain is detected at step 410 by, for example, a subnet router or an IP forwarding device, a rate limited discovery request function call is triggered, in particular embodiments, on the first ingress IP forwarding device to the other IP forwarding devices in the IP forwarding domain.

Referring to FIG. 4, the IP forwarding devices in particular embodiments are configured to transmit a corresponding ARP probe packet at step 430. Thereafter, when a response to the ARP probe packet is detected by one of the IP forwarding devices, then a host route is injected as shown in step 450. Thereafter, the data traffic starts. In particular embodiments, to prevent aging of the host routes, a configurable host tracking procedure may be implemented to track silent hosts.

In a further embodiment, to allow roaming of host devices between IP forwarding devices, and to avoid requiring changes on the host stacks, the IP forwarding devices may be configured to share a single virtual MAC address per subnet on host facing ports. This allows a host to roam from one IP forwarding device to another, without the need to flush its ARP tables. In addition, the proxy ARP may be tuned on all IP forwarding devices to proxy for any IP address associated with an IP forwarding domain subnet, with its virtual MAC address for that subnet.

Moreover, as discussed above, in particular embodiments, the IP forwarding domain includes three types of devices—domain border routers, intermediate routers, and forwarding devices (which may be switches to which there is at least one end host directly connected). Moreover, in particular embodiments, a switch may be configured to incorporate multiple features and functions of the three types of devices described above.

In the manner described above, in accordance with particular embodiments, there may be provided methods and systems for layer 3 forwarding mechanism with a distributed router using preexisting and sub-domain routing protocols. More specifically, forwarding of data traffic may be based on the IP DA addresses in the IP packet for the subnets on which layer 3 to the socket mechanism is enabled. As such, in particular embodiments, VLANs no longer span switches in the network, but rather, there are no specific VLANs associated with a subnet. As the hosts belonging to the subnet can be present anywhere in the network domain where layer 3 to the socket mechanism is enabled, host routes are only propagated within this network domain, and not advertised outside the layer 3 to the socket domain. Rather, in particular embodiments, only the subnet is advertised outside of the layer 3 to the socket network domain.

In addition, in particular embodiments, the forwarding of the traffic using layer 3 mechanism provides optimal path forwarding, no exponential data loops (packets have TTL.hop count) or multi path forwarding, and flooding of traffic destined to an unknown destination may be prevented, for example.

Moreover, in accordance with the particular embodiments, as VLANs no longer span switches, loops are not formed, and thus spanning tree protocol is unnecessary. In this manner, in particular embodiments, on a network switch which has all of its ports configured to execute the layer 3 to the socket mechanism, each port of the switch may be treated as its own bridge domain including only that port. That is, each port on the network switch belongs to a unique VLAN for that switch, or every port on the network switch is a protected port (for example, a private VLAN edge isolated). This in turn results in data traffic which is not layer 2 bridged between the ports in the layer 3 to the socket network domain, but rather, which is routed.

Accordingly, in particular embodiments, there are provided methods and systems for layer 3 forwarding mechanism with a distributed router using preexisting and sub-domain routing protocols. In this manner, it is possible to achieve aggressive fail over, effective multi-path forwarding, provide immunity to spoofing, and also provide immunity to snooping and/or flooding attacks of the network without the need for additional hardware, and without requirements to provide data packet format changes. Additionally, in particular embodiments, additional more advanced layer 3 and above network services may be pushed to the network edge, such as Multi Topology Routing (MTR), Virtual Routing and Forwarding (VRF) and so on.

In this manner, in particular embodiments, there are provided approaches for layer 3 forwarding mechanism with a distributed router using preexisting and sub-domain routing protocols.

Accordingly, the particular embodiments may include detecting data traffic in a data forwarding domain, injecting a host route associated with the detected data traffic, and updating a forwarding table associated with the host route.

The data traffic may be detected from a host device, and which may be an unknown device.

The host route in one aspect may be propagated within the data forwarding domain, based on a predetermined routing protocol such as, for example, Open Shortest Path First (OSPF), Enhanced Interior Gate Routing Protocol (EIGRP), Intermediate System to Intermediate System (ISIS), interior Border Gateway Protocol (iBGP), or a predetermined routing protocol.

The method may also include in particular embodiments, triggering a rate limited discovery request function call.

A method in particular embodiments includes receiving a host route, receiving a subnet route entry corresponding to a subnet from a respective subnet default router, comparing host paths to subnet route paths, and installing the host route when the subnet route paths do not correspond to the host paths.

Installing the host route in particular embodiments may be executed when the subnet route paths do not exactly match the respective host paths.

The default router in a further aspect may be configured to advertise the subnet entry.

A system in particular embodiments includes a host device, and a data forwarding device configured to detect data traffic from the host device in a data forwarding domain, the data forwarding device further configured to inject a host route associated with the detected data traffic, and to update a forwarding table associated with the host route.

The data forwarding device in particular embodiments may be configured to trigger a rate limited discovery request function call.

The forwarding table in one aspect includes an ARP table.

In a further aspect, the data forwarding device may include one or more of a network switch or a network router.

A system in particular embodiments includes a host device, and a data forwarding device operatively coupled to the host device, the data forwarding device configured to receive a host route from the host device, the data forwarding device further configured to receive a subnet route entry corresponding to a subnet from a respective subnet default router, to compare host paths to subnet route paths, and to install the host route when the subnet route paths do not correspond to the host paths.

The data forwarding device in still another aspect may be configured to install the host route when the subnet route paths do not exactly match the respective host paths.

The default router may be configured to advertise the subnet entry. A system for providing data network route forwarding in still another embodiment may include means for detecting data traffic from a host device in a data forwarding domain, means for injecting a host route associated with the detected data traffic, and means for updating a forwarding table associated with the host route.

The various processes described above including the processes performed by the hosts 120A, 120B, 120C, 120D, 120E, 120F, 120G, 120H, the IP forwarding devices 130A, 130B, 130C, 130D, the intermediate routers 140A, 140B, and the domain border routers 150A, 150B in the software application execution environment in the data network 100 including the processes and routines described in conjunction with FIGS. 4 and 5, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the IP forwarding devices 130A, 130B, 130C, 130D, the intermediate routers 140A, 140B, and the domain border routers 150A, 150B, may be developed by a person of ordinary skill in the art and may include one or more computer program products.

Various other modifications and alterations in the structure and method of operation of the particular embodiments will be apparent to those skilled in the art without departing from the scope and spirit of the disclosure. Although the disclosure has been described in connection with specific particular embodiments, it should be understood that the disclosure as claimed should not be unduly limited to such particular embodiments. It is intended that the following claims define the scope of the present disclosure and that structures and methods within the scope of these claims and their equivalents be covered thereby.

What is claimed is:

1. A method, comprising:
  learning, at a forwarding device that has a plurality of ports and is configured to be disposed within a data forwarding domain having a plurality of subnets, a network address of a host directly connected to one of the ports of the forwarding device;
  installing a route to the host in a routing table at the forwarding device;
  propagating, by the forwarding device, a host route for reaching the host via the forwarding device, provided that the network address of the host belongs to one of the subnets of the data forwarding domain;
  detecting whether the host remains directly connected to the forwarding device;
  issuing, by the forwarding device, a withdrawal of the host route, if the host is no longer directly connected to one of the ports of the forwarding device; and
  exchanging all data traffic between the forwarding device and the host at a network layer of a communication protocol stack,
    wherein the forwarding device does not bridge data traffic from the host to another port of the forwarding device.

2. The method of claim 1 further comprising associating the learned network address of the host with the forwarding device.

3. The method of claim 1 wherein the host route is propagated within the data forwarding domain.

4. The method of claim 3 wherein the host route is propagated based on Open Shortest Path First (OSPF), Enhanced Interior Gate Routing Protocol (EIGRP), Intermediate System to Intermediate System (ISIS), interior Border Gateway Protocol (iBGP), or a predetermined routing protocol.

5. The method of claim 1 further including triggering a rate limited discovery request function call.

6. The method of claim 1 wherein the forwarding table includes an ARP table.

7. A method, comprising:
  receiving a subnet route entry corresponding to a subnet from a respective subnet default router;
  installing the subnet route entry in a forwarding table;
  receiving a host route entry having a network address of the host, the network address belonging to the subnet of the installed subnet route entry;
  comparing the host route entry to the installed subnet route entry;
  installing the host route entry in the forwarding table when the installed subnet route entry does not correspond to the received host route entry; and
  when the installed subnet route entry exactly matches the received host route entry, not installing the host route entry in the forwarding table.

8. The method of claim 7 wherein the step of installing the host route entry is executed when the subnet route entry does not exactly match the host route entry.

9. The method of claim 7 wherein the default router is configured to advertise the subnet entry.

10. A system, comprising:
  a host device; and
  a data forwarding device having a port to which the host device is directly connected, the data forwarding device configured to
    be disposed in a data forwarding domain having a plurality of subnets,
    learn a network address of the host device,
    propagate a host route for reaching the host device via the data forwarding device, provided that the network address of the host device belongs to one of the subnets of the data forwarding domain,
    detect whether the host device remains directly connected to the port;
    issue a withdrawal of the host route, if the host device is no longer directly connected to the port, and
    exchange all data traffic with the host device at a network layer of a communication protocol stack.

11. The system of claim 10 wherein the host device is an unknown device.

12. The system of claim 10 wherein the host route is propagated within the data forwarding domain.

13. The system of claim 12 wherein the data forwarding device is configured to propagate the host route based on a predetermined routing protocol.

14. The system of claim 13 wherein the predetermined routing protocol includes Open Shortest Path First (OSPF), Enhanced Interior Gate Routing Protocol (EIGRP), Intermediate System to Intermediate System (ISIS), interior Border Gateway Protocol (iBGP), or a predetermined routing protocol.

15. The system of claim 10 wherein the data forwarding device is further configured to trigger a rate limited discovery request function call.

16. The system of claim 10 wherein the forwarding table includes an ARP table.

17. The system of claim 10 wherein the data forwarding device includes one or more of a network switch or a network router.

18. A system, comprising:
  a host device;
  a subnet default router; and
  a data forwarding device operatively coupled to the host device and the subnet default router, the data forwarding device having a forwarding table and configured to
    receive a host route for the host device,
    receive a subnet route entry from the subnet default router,
    install the subnet route entry in the forwarding table,
    compare the received host route to the installed subnet route entry, install the received host route in the forwarding table,
  when the subnet route entry does not correspond to the received host route, and
  when the subnet route entry exactly matches the received host route, not install the received host route in the forwarding table.

19. The system of claim 18 wherein the data forwarding device is further configured to install the host route when the subnet route paths do not exactly match the respective host paths.

20. The system of claim 19 wherein the default router is configured to advertise the subnet entry.

21. A system, comprising:
  means for learning, at a forwarding device having a plurality of ports and configured to be disposed in a data forwarding domain, a network address of a host directly connected to one of the ports of the forwarding device;
  means for propagating a host route for reaching the host via the forwarding device, provided that that network address of the host belongs to one of the subnets of the forwarding domain;
  means for detecting whether the host remains directly connected to the forwarding device;
  means for issuing a withdrawal of the host route, if the host is no longer directly connected to one of the ports;
  means for exchanging all data traffic with the host at a network layer of a communication protocol stack.

* * * * *